United States Patent Office 3,365,972
Patented Jan. 30, 1968

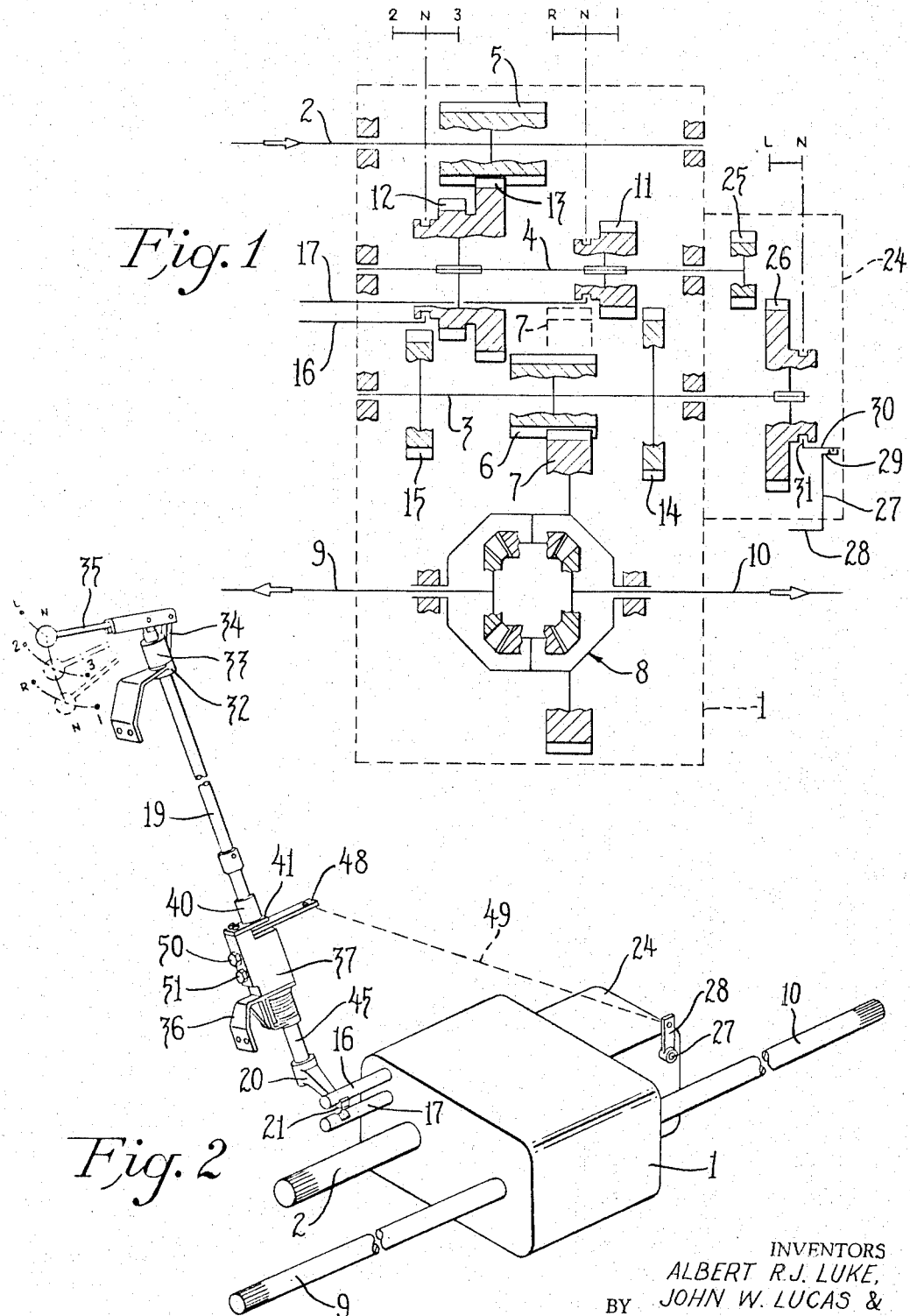

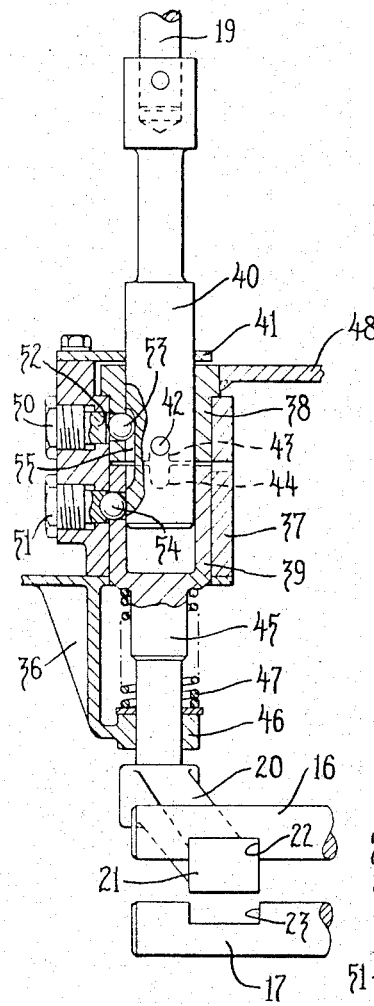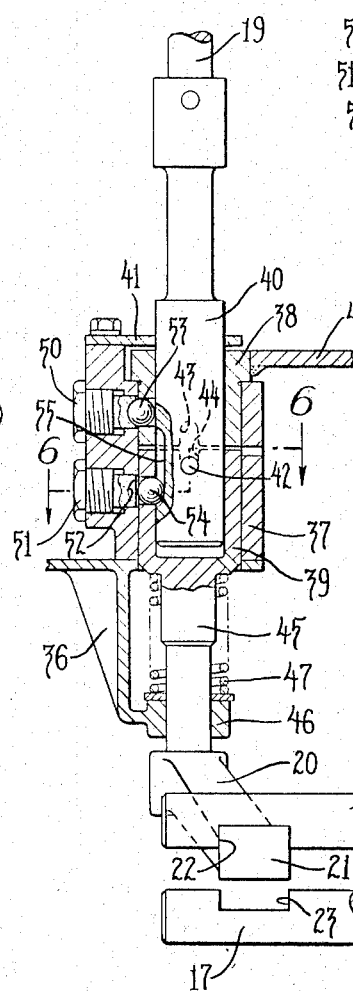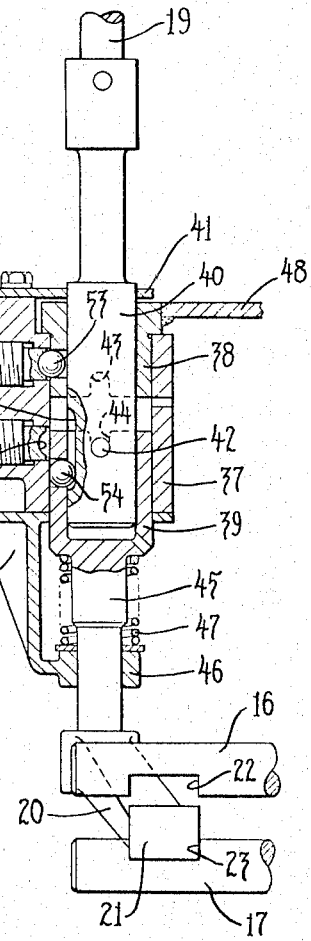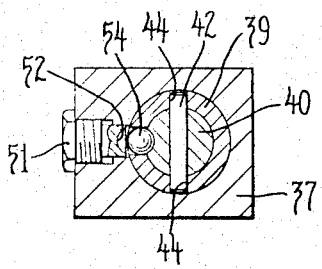

3,365,972
FOUR-SPEED TRANSMISSION WITH INTERLOCK
Albert R. J. Luke, Toronto, Ontario, John W. Lucas, Islington, Ontario, and Wolfgang H. Scholich, Scarborough, Ontario, Canada, assignors to Massey-Ferguson Industries Limited, Toronto, Ontario, Canada
Filed June 17, 1965, Ser. No. 464,808
3 Claims. (Cl. 74—342)

This invention relates generally to vehicle transmissions, and is particularly concerned with transmissions suitable for agricultural combines.

The speed of agricultural combines is controlled by the transmission, that is, the operator determines the speed by setting the gear ratio when the vehicle is stopped. When the crop yield varies from light to medium heavy, a standard three-speed transmission is satisfactory with the wider 16-, 18- or 20-foot tables normally used by custom operators. However, in some areas of North America, crops such as wheat, barley, rice and safflower yield very high quantities of grain and straw necessitating a lower forward speed than provided by first gear of the standard three-speed transmission, in order to maintain the desired input of crop material into the combine with the wide tables. The lower speed reduces the rate the material is fed into the combine, thereby maintaining proper balance between threshing and separating.

In accordance with the present invention, a conventional three-speed transmission is converted into a four-speed transmission by the addition externally of an auxiliary gear box having a lower gear ratio arranged in parallel witth the main, three-speed gear box. Furthermore, an interlock mechanism is provided externally between the conventional shift mechanism and the main and auxiliary gear box which operates to prevent more than one of the speed change gears from being engaged at a time, and which retains the inactive shift rails in their neutral positions when one of the other rails is being shifted to connect the input shaft with the output shaft of the transmission.

The objects, advantages and features of the invention will become apparent from the following description taken in connection with the accompanying drawings in which:

FIG. 1 is a schematic diagram of a transmission embodying the invention;

FIG. 2 is a perspective view of the transmission, interlock and shifting mechanism;

FIGS. 3, 4 and 5 are elevational views, partially in section, of the interlock mechanism with the selector rod shown in alternate neutral positions in each of the views; and FIG. 6 is a sectional view taken on line 6—6 of FIG. 4.

With reference to FIGS. 1 and 2, a conventional three-speed gear box is designated by reference numeral 1 and includes a transmission unit having an input shaft 2, an output shaft 3, and a countershaft 4. A drive gear 5 is fixed to input shaft 2 and an output gear 6 is fixed to output shaft 3 for driving engagement with the ring gear 7 of a differential unit 8 for axles 9 and 10. Speed change gearing is mounted on countershaft 4 and output shaft 3 for transmitting drive between gears 5 and 6 and includes first, second and third gears 11, 12 and 13, respectively, slidably and non-rotatably mounted on countershaft 4. Fixed to output shaft 3 are gears 14 and 15 which are selectively engageable by gears 11 and 12, respectively.

The transmission unit includes a shifting rail 16 for operating gears 12 and 13 between gears 15 and 6, respectively, and a shifting rail 17 for operating gear 11 between gear 14 and gear 7 (the portion schematically offset and indicated in phantom lines in FIG. 1).

The shift rails 16 and 17 are operated by a selector rod 19 engageable with an actuating arm 20 having an actuating lug 21 carried at its end. Lug 21 is selectively engageable with notches 22 and 23 formed respectively in shift rails 16 and 17. When actuating lug 21 is engaged with shift rail 16 as shown in FIG. 4, movement of shift rail 16 to the left causes gear 12 to engage gear 15 and provide a drive path from gear 5 through gears 13, 12, 15, 6 and 7. Movement of actuating arm 20 to the right as viewed in FIG. 4 causes gear 13 to engage gear 6 and provide a drive path from gear 5 through gears 13, 6 and 7. In the positions illustrated in FIGS. 1 and 4, gears 12 and 13 as well as shift rod 16 are in their neutral positions.

When actuating lug 21 is engaged with shift rail 17 as shown in FIG. 5, movement of actuating arm 20 to the left as viewed in FIG. 5 causes gear 11 to engage the gear 7 and the drive is from gear 5 through gear 13 to countershaft 4, and from shaft 4 through gears 11 and 7. Conversely, movement of actuating arm 20 to the right as viewed in FIG. 5 causes gear 11 to engage gear 14 to transmit drive from countershaft 4 to shaft 3. Shift rails 16 and 17 are each connected by conventional forks to gears 12 and 11, respectively. The spacing between shift rails 16 and 17 is such that lug 21 can be shifted downwardly from shift rail 16 to shift rail 17 and vice versa, only when the shift rails are in their neutral positions as illustrated in FIGS. 3, 4 and 5.

In order to convert the main gear box 1 from a three-speed to a four-speed transmission, an auxiliary gear box 24 is mounted on the main gear box 1 as shown in FIGS. 1 and 2. The auxiliary gear box 24 encloses gears 25 and 26 mounted respectively on countershaft 4 and output shaft 3 which are extended to project into gear box 24. Gears 25 and 26, when engaged, provide an additional low gear ratio to drive output shaft 3 at a speed lower than the first gear ratio provided by engagement of gears 11 and 14. Gear 26 is slidably and non-rotatably mounted on the extension of output shaft 3, and gear 25 is fixed to the extended end of countershaft 4. Rotatably mounted in the auxiliary gear box 24 is a shaft 27 having a shift lever 28 mounted on its outer end. By rotating shift lever 28, an actuating link 29 carried at the opposite end of shaft 27 from lever 28 causes a shift rail 30 having a fork 31 engaged with gear 26 to move gear 26 axially along shaft 3. When gear 26 is shifted to the left as viewed in FIG. 1, it engages gear 25 to provide a drive path from gear 5 through gear 13 to countershaft 4, and from countershaft 4 through gears 25 and 26 to output shaft 3.

The selector rod 19 is slidably supported in an upper support member 32, and concentrically mounted on the upper end of selector rod 19 is a sleeve member 33 having an upwardly and outwardly projecting arm 34 mounted thereon. Pivotally connected to the arm 34 and the upper end of selector rod 19 is a selector lever 35. Mounted on a lower support 36 is a housing 37 having a cylindrical opening formed therein which receives upper and lower cylindrical sleeves 38 and 39, respectively.

Selector rod 19 has a lower, enlarged end 40 received in the upper and lower sleeves 38 and 39 shown in FIGS. 3, 4 and 5, and is supported transversely by an apertured plate 41 bolted to the upper edge of housing 37. Mounted transversely in end portion 40 of selector rod 19 is an actuating pin 42 which is engageable with vertical grooves 43 and 44 formed on diametrically opposite sides of sleeves 38 and 39, respectively. When pin 42 is seated in grooves 43, rotation of selector rod 19 is transmitted to sleeve 38 to rotate sleeve 38 relative to housing 37. Similarly, when pin 42 is seated in grooves 44 of the lower sleeve 39, the latter may be similarly rotated by selector rod 19.

Depending from the lower sleeve 39 is a vertical rod 45 which is slidably and rotatably supported in a collar 46 on lower support 36. A spring 47 is seated between collar 46 and the lower side of sleeve 39 for urging sleeve 39 in an axial upward direction as viewed in FIGS. 3, 4 and 5. Actuating arm 20 is fixed to the lower end of rod 45 for actuating shift rails 16 and 17 in response to rotation of rod 45.

Secured to the upper end of sleeve 38 is an operating lever 48 which is connected by suitable linkage, indicated schematically at 49 in FIG. 2, with the shift lever 28 of the auxiliary gear box 24. Thus, upon rotation of sleeve 38 in housing 37, lever 48 actuates shifting lever 28 to shift gear 26 axially on shaft 3.

Threadedly mounted in the side wall of housing 37 is a pair of ball retainers 50 and 51 each having a spherical recess 52 formed in its inner end. Recesses 52 each receive balls 53 and 54 which in turn are engageable with radial openings in the side wall of sleeves 38 and 39, respectively. Formed in rod 40 is a longitudinal recess 55 having a width sufficient to receive one of the balls 53 and 54 as shown in FIGS. 3 and 4, depending upon the position of rod end 40 within sleeves 38 and 39.

With reference to FIG. 2, selector lever 35 has three vertically spaced neutral positions as indicated at N in FIG. 2, and five drive positions, namely, first, second, third, low and reverse as indicated respectively at 1, 2, 3, L and R. Selector lever 35 is in its upper neutral position in FIGS. 2 and 3. When the selector lever is in the upper neutral position as shown in FIG. 3, groove 55 is aligned with ball 53 and receives ball 53 through the opening in upper sleeve 38. The transverse pin 42 is engaged with grooves 43 such that rotation of the selector rod 19 will in turn cause rotation of sleeve 38 as well as lever 48. Sleeve 39 is locked against rotation by the engagement of ball 54 with the recess 52 in retainer 51 and the opening in the wall of sleeve 39. Ball 54 is retained in this position by the portion of rod 40 below groove 55 which prevents the ball from escaping from the spherical recess 52. Thus, rotation of selector rod 19 will cause sleeve 38 only to rotate and actuate gear 26 along the axis of output shaft 3. As viewed in FIG. 3, rotation of selector rod 19 to the left will cause the shift rail 30 to move to the left and engage gear 26 with gear 25 to provide a drive path through gears 5, 13, 25, 26, 6 and 7. Shift rails 16 and 17 are retained in their neutral positions since sleeve 39 is prevented from rotating by ball 54.

To shift from low to either second or third gear, the selector lever 35 must first be moved to the intermediate neutral position, in which position rod 40 moves downwardly from the position shown in FIG. 3 and pin 42 engages grooves 44 in the lower sleeve 39 as shown in FIG. 4. The longitudinal groove 55 is positioned to receive the lower ball 54 and the ball 53 is retained in engagement with recess 52 of member 50 by the smooth portion of rod 40. Thus, the upper sleeve 38 is prevented from rotating from its neutral position by ball 53, and rotation of selector rod 19 will cause sleeve 39 to rotate and actuate shift rail 16 to the left or right as viewed in FIG. 4. Movement of shift rail 16 to the right in FIG. 4 causes gear 13 to engage gear 6 and provide a drive path from gear 5 through gear 13 to gear 6. Conversely, movement of shift rail 16 to the left causes gear 12 to engage gear 15 to provide a drive path from gear 5 through gears 13, 12 and 15 to shaft 3.

To shift to either reverse or first gear, the selector lever is moved to the lowest neutral position illustrated in FIG. 2, and rod 40 moves downwardly carrying with it sleeve 39 to compress spring 47 and move lug 21 from notch 22 of shift rail 16 to notch 23 of shift rail 17 as shown in FIG. 5. As pointed out previously, the spacing between shift rails 16 and 17 is such that lug 21 can move from one to the other of notches 22 and 23 only when the shift rails are in their neutral positions. In the position of FIG. 5, ball 53 is still retained in position to lock sleeve 38 against rotation, and rotation of selector rod 19 causes shift rail 17 to move either to the left or right. Movement of shift rail 17 to the right causes gear 11 to engage gear 14 to drivingly connect shafts 4 and 3 through gears 11 and 14. Conversely, movement of shift rail 17 to the left causes gear 11 to engage gear 7 to drivingly engage shaft 4 with axle shafts 9 and 10 through gears 11 and 7.

The interlock provided by balls 53, 54 and groove 55, prevents the shifting by selector lever 35 of any of the shift rails 16, 17 or 30 while any of the other gears are engaged. Thus, in order to shift from one speed to another, the selector lever 35 must be moved to one of the three neutral positions which automatically disengages all of the gears. In any of the three neutral positions of selector lever 35, the gears are all in neutral as shown in FIG. 1. The interlock is thus provided externally of the main gear box 1 eliminating the necessity for modifying the conventional three-speed shift internally.

While a specific embodiment of the invention has been illustrated and described in the foregoing specification and drawings, it should be understood that the invention is not limited to the exact construction shown, but that various alternative arrangements will be apparent to those skilled in the art without departing from the scope and spirit of the invention.

What is claimed is:

1. A transmission unit comprising a main gear box having an input shaft and an output shaft; speed change gearing for selectively engaging said input and output shafts to provide first, second, third and reverse drive paths therebetween; a first shift rail mounted in said main gear box for movement between active and neutral positions for selectively actuating said speed change gearing between a neutral position and said second and third drive paths; a second shift rail mounted in said main gear box for movement between active and neutral positions for selectively actuating said speed change gearing between a neutral position and said first and reverse drive paths; an auxiliary gear box mounted on said main gear box; auxiliary speed change gearing in said auxiliary gear box for selectively engaging said input and output shafts to provide a low gear path therebetween; a third shift rail mounted in said auxiliary gear box for movement between active and neutral positions for selectively actuating said auxiliary speed change gearing between a neutral position and said low drive path; interlock means mounted externally of said main and auxiliary gear boxes comprising a housing having a cylindrical bore therein; an upper sleeve member rotatably mounted in said bore; a lower sleeve rotatably mounted in said bore beneath in coaxial relationship with sa diupper sleeve and axially movable within said bore between first and second positions; actuating means carried by said lower sleeve engageable with said first shift rail when said lower sleeve is in its first position for actuating said first shift rail upon rotation of said lower sleeve, and engageable with said second shift rail when said lower sleeve is in its second position for actuating said second shift rail upon rotation of said lower sleeve; means connecting said upper sleeve with said third shift rail for actuating said third shift rail upon rotation of said upper sleeve; a selector rod mounted in said sleeves for axial movement between a first position in which it is engaged with said upper sleeve to selectively rotate said upper sleeve and actuate said third shift rail, a second position in which it is engaged with said lower sleeve in the first position of the lower sleeve to selectively rotate the lower sleeve and actuate said second shift rail, and a third position in which it is engaged with the lower sleeve in its second position to selectively rotate the lower sleeve and actuate said second shift rail; and locking means for restraining said upper and lower sleeves against rotation and releasable by said selector rod to permit rotation of one of said sleeves only when said selector rod is engaged therewith.

2. A transmission unit as defined in claim 1 wherein said locking means includes: a radial opening in the wall of each of said sleeves; a pair of axially spaced ball retaining recesses in the wall of said cylindrical bore in alignment with said radial openings when the sleeves are in positions corresponding to the neutral positions of said first and third shift rails with the lower sleeve in its first position; a ball received in each of said radial openings held in engagement with its associated ball retaining recess when the selector rod is engaged with the other sleeve; said balls each being alternately disengageable from said ball retaining recess by movement of said selector rod into engagement with the associated sleeve.

3. A transmission unit as defined in claim 2 further including a longitudinal groove formed in said selector rod movable into alignment with the radial opening of the sleeve engaged by the selector rod to permit the ball to disengage from its retaining recess, and said groove being aligned only with the engaged sleeve.

References Cited

UNITED STATES PATENTS

| 2,602,346 | 7/1952 | Eaton et al. | 74—745 |
| 2,615,346 | 10/1952 | Simpson et al. | 74—473 |
| 2,922,315 | 1/1960 | Primeau | 74—473 |
| 3,088,336 | 5/1963 | Fodrea | 74—745 |

FOREIGN PATENTS

| 987,478 | 8/1951 | France. |

DONLEY J. STOCKING, *Primary Examiner.*

H. S. LAYTON, *Assistant Examiner.*